Nov. 15, 1966  S. ELAZAR  3,285,074
AMPLITUDE DAMPED TRANSDUCER
Filed Sept. 8, 1964  3 Sheets-Sheet 1
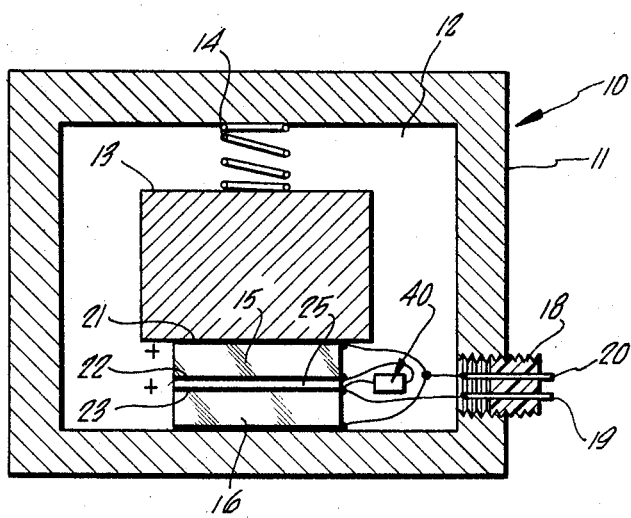
FIG. 1
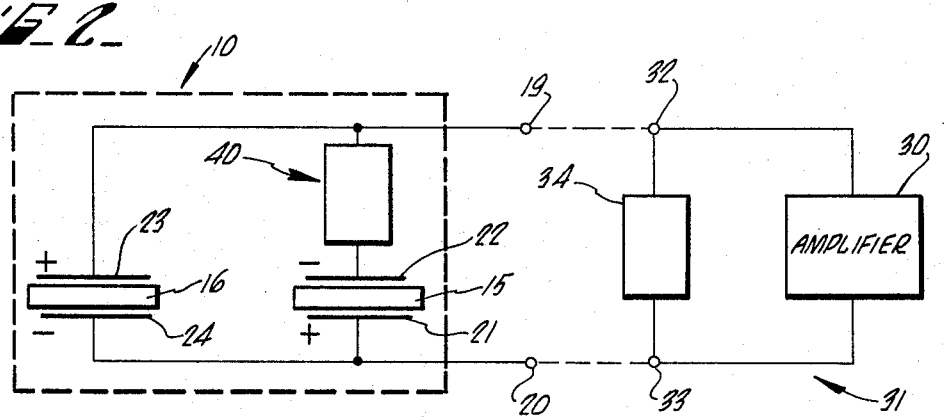
FIG. 2
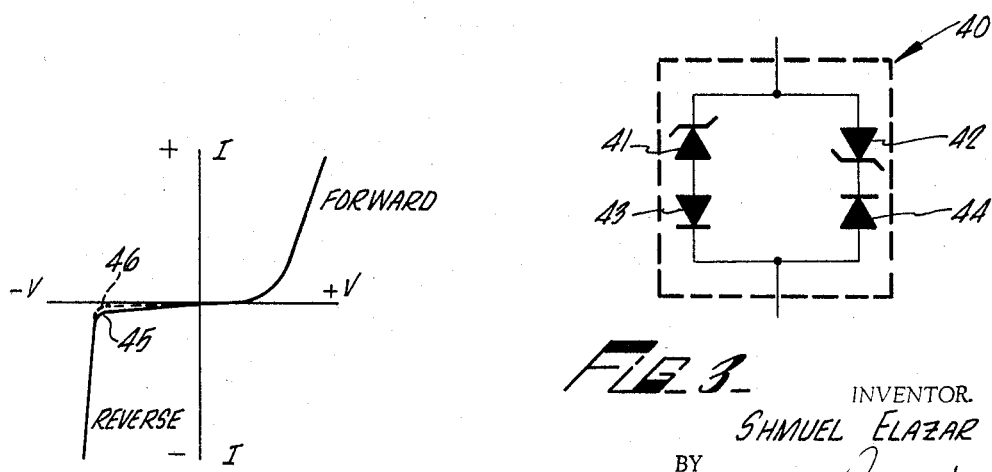
FIG. 3
FIG. 4
INVENTOR.
SHMUEL ELAZAR
BY
Christie, Parker & Hale
ATTORNEYS.

Nov. 15, 1966  S. ELAZAR  3,285,074
AMPLITUDE DAMPED TRANSDUCER
Filed Sept. 8, 1964  3 Sheets-Sheet 2
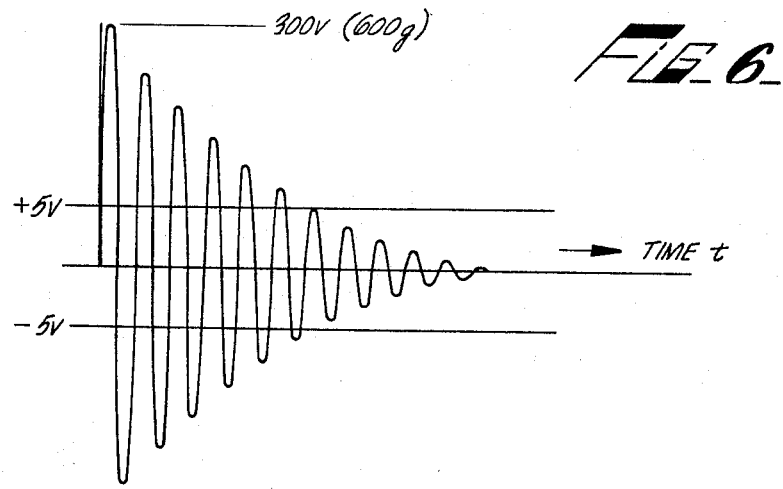
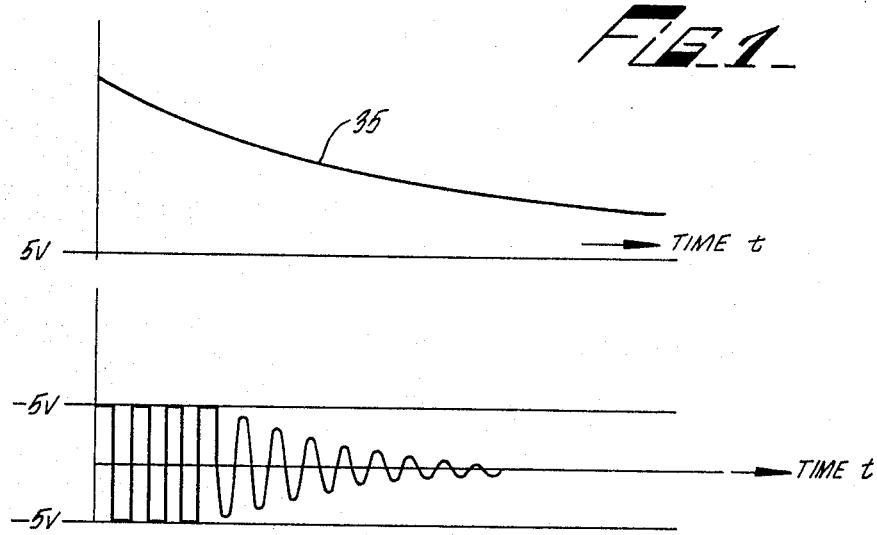
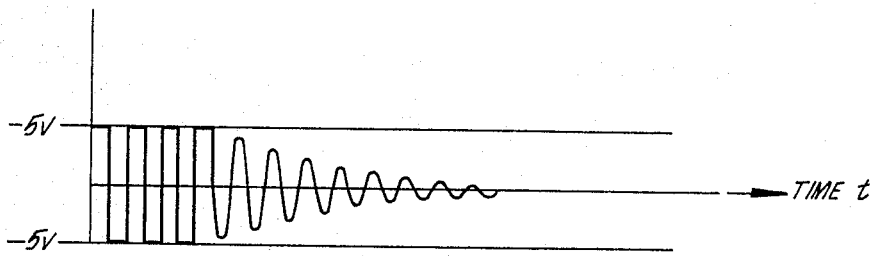
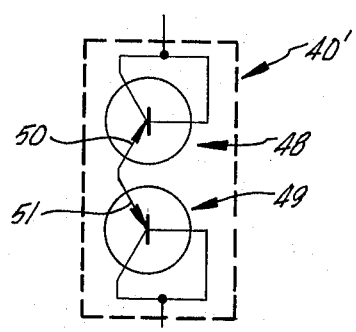
INVENTOR.
SHMUEL ELAZAR
BY
Christie, Parker & Hale
ATTORNEYS.

Nov. 15, 1966        S. ELAZAR            3,285,074
            AMPLITUDE DAMPED TRANSDUCER
Filed Sept. 8, 1964                3 Sheets-Sheet 3
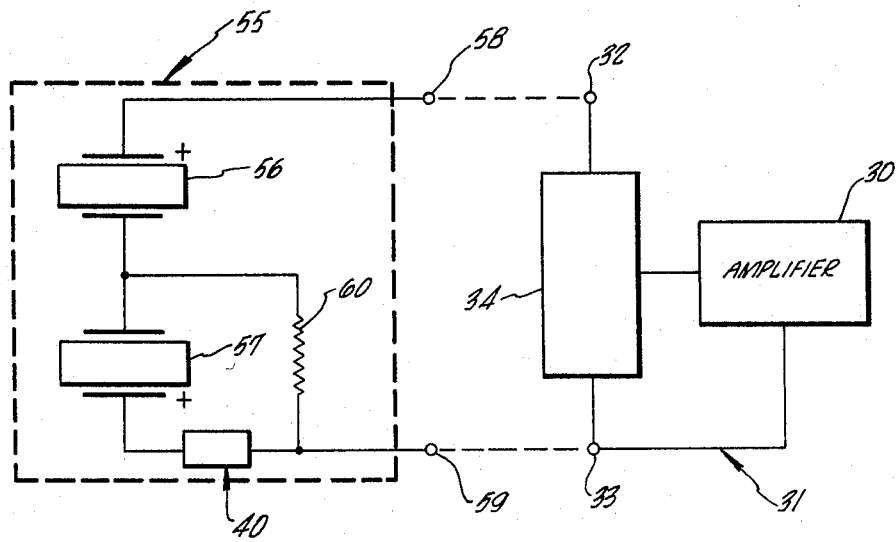
*FIG_9_*
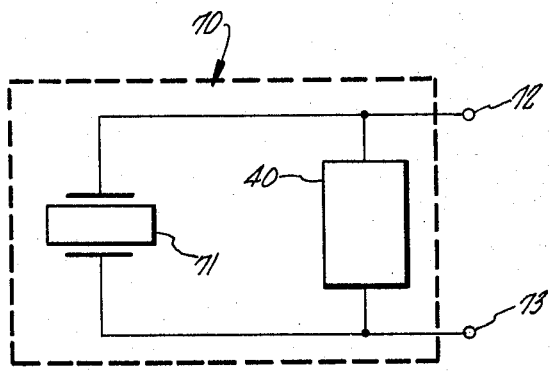
*FIG_10_*
INVENTOR.
SHMUEL ELAZAR
BY
Christie, Parker & Hale
ATTORNEYS.

United States Patent Office 3,285,074
Patented Nov. 15, 1966

3,285,074
AMPLITUDE DAMPED TRANSDUCER
Shmuel Elazar, El Monte, Calif., assignor to Consolidated Electrodynamics Corporation, Pasadena, Calif., a corporation of California
Filed Sept. 8, 1964, Ser. No. 394,963
17 Claims. (Cl. 73—517)

This invention relates to transducers and, more particularly, to transducers which includes means for limiting the output in the transducer regardless of the value of the signals generated interiorly of the transducer.

A piezoelectric accelerometer develops a voltage proportional to the number of g's acceleration to which it is subjected. Such acceleration is conveniently measured in multiples of the value of the acceleration of gravity at sea level, designated "g." The accelerometer is designed to produce a constant number of millivolts for every g input through the operating range of the accelerometer. The number of millivolts generated per g is called the voltage sensitivity of the accelerometer. For an accelerometer with a voltage sensitivity of 50 mv./g. subject to 50 g's of steady-state acceleration, the accelerometer output would be 2.5 volts. Similarly, for a 6,000 g shock impulse, a common occurrence in acceleration measurement, the output voltage of the accelerometer would equal 300 volts. The accelerometer, however, must be sensitive enough to develop a measurable voltage for inputs as low as .2 g in most cases.

For many transducers, such as piezoelectric transducers, having electrical output signals, the output signal must be amplified or otherwise conditioned before it is in a form for presentation to a readout device such as a vacuum tube voltmeter, an oscilloscope, or an oscillograph, for example. The external signal conditioning circuit such as an amplifier circuit with which the transducer is used may be designed to pass without distortion a 2.5 volt signal, for example. If the input voltage is large enough, the circuit may not be able to pass any signal at all for several seconds due to saturation or electrical blocking. Such blocking usually is produced by charging the high capacitance normally present in the circuit, which charge requires several seconds to decay. During the time the circuit is blocked, much valuable data from the transducer may be lost. For excessively large signal amplitudes, permanent damage may result to the circuit.

This invention provides a transducer which has built-in overvoltage protection for the external impedance matching and signal conditioning circuit. Preferably, the output signal of the transducer is limited to a value which does not produce distortion in the signal conditioning circuit. Accordingly, circuits used with a transducer according to this invention are not subject to capacitative blocking with the result that signals within the designed operating range of the circuit which immediately follow a high value peak in the transducer output signal are available substantially immediately for presentation to a readout device, and are not lost.

Generally speaking, this invention provides a transducer which comprises a member mounted in the transducer for movement in response to variations in a selected physical phenomenon to be measured by the transducer. Means in the transducer are coupled to the member to be responsive to the movement of the member for generating a pair of charges which have values proportional to the movement of the member. Transducer output terminal means are also provided together with means for applying one charge across to the terminal means. The transducer further includes control means for subtracting the other charge from the one charge when the charge impressed on the control means exceeds a predetermined value so that the transducer has an output signal defined by the difference in the charges. Preferably the generated charges are equal so that the output signal never has a value greater predetermined charge value.

The invention is described herein in the context of a piezoelectric accelerometer merely for the purposes of explaining a presently preferred embodiment of the invention. Any transducer which provides an electrical output may be amplitude damped, i.e., the amplitude of the transducer output signal may be limited. This is true whether the transducer is designed to sense accelerations or pressure, for example, or whether the mechanism for generating the signals are piezoelectric crystals, potentiometers, strain gages, or the like.

The above mentioned and other features of the invention are more fully set forth in the following detailed description of the invention taken in conjunction with the accompanying drawings, wherein:

FIG. 1 is a cross-sectional elevation view of a piezoelectric accelerometer embodying the invention;

FIG. 2 is an electrical schematic diagram of the transducer shown in FIG. 1;

FIG. 3 is an electrical schematic diagram of the means which define a predetermined difference between the signals generated in the transducer;

FIG. 4 is a diagram of the volt/ampere characteristics of the circuit components shown in FIG. 3;

FIG. 5 is an alternate embodiment of the circuit shown in FIG. 3;

FIG. 6 is a graph, plotted against time, of the signals generated in an accelerometer when the accelerometer is subjected to a high g shock impulse;

FIG. 7 is a graph, plotted against time, of the output of a typical amplifier when the signal shown in FIG. 6 is applied to the amplifier without amplitude damping of the signal;

FIG. 8 is a graph, plotted against time, of the response of the output signal of an amplitude damped accelerometer when the signal represented in FIG. 6 is generated within the accelerometer shown in FIGS. 1 and 2, for example;

FIG. 9 is an electrical schematic diagram of a frequency responsive amplitude damped transducer; and FIG. 10 is an electrical schematic diagram of a transducer which is to be contrasted from an amplitude damped transducer according to this invention.

Referring to FIGS. 1 and 2, a piezoelectric accelerometer 10 according to this invention has a housing 11 which encloses an internal chamber 12. A seismic mass 13 is disposed in the chamber and is biased toward the housing at the lower end of the chamber by a compliant mechanism shown in the form of a compression spring 14.

A pair of signal generating means are coupled to mass 13 to generate preferably substantially equal signals which have values proportional to the movement of the mass along a line vertically of the housing. As shown in FIG. 1, the sensing means comprises a pair of piezoelectric crystals 15 and 16 which are engaged between the mass and the housing opposite from the compliant mechanism. As accelerations are applied vertically to the housing, the crystals are compressed between the housing and the mass because of the tendency of the mass to remain at rest within the housing. The crystals, since they are piezoelectric crystals, generate electric charges as they are deformed. These charges are proportional to the distance the mass moves relative to the housing against the crystals. Each crystal also acts as a capacitance. The charge present on the crystal may be regarded as a voltage since the capacity of the crystal is essentially constant, assuming constant temperature operation of the crystal. Preferably the crystals are identical and manifest equal voltages as they are deformed. That is, the crystals have equal voltage (or charge) sensitivity characteristics. Crystals 15 and 16 may be composed of any suitable piezoelectric material.

A portion of an electrical connector 18 is mounted to the housing and carries a pair of transducer output terminals 19 and 20. The terminals are connected to a plurality of conductive members 21, 22, 23, and 24, which are sandwiched between the mass and the housing with crystals 15 and 16. Conductive member 21 is disposed between crystal 15 and the mass. Conductive members 22 and 23 are spaced apart by a non-conductive element 25 and are disposed between crystals 15 and 16 and are in contact with the respective crystals. Conductive member 24 is disposed between crystal 16 and the housing. If desired, the terminals may be connected directly to the crystals, in which case the conductive members may be omitted.

The crystals are connected in parallel with one another between terminals 19 and 20 as shown in FIG. 2. Moreover, the crystals are so connected to the terminals that the charges produced by the crystals oppose each other at the terminals.

The usual piezoelectric accelerometer generates only a single charge, and this charge is manifested as a voltage as the output of the accelerometer. FIG. 6 shows the output of such a transducer having a voltage sensitivity of 50 millivolts per $g$ during and following a 6,000 $g$ input shock to the transducer. FIG. 7 shows how an amplifier, such as amplifier 30 (see FIG. 2), is capacitatively blocked when the signal shown in FIG. 6 is applied to the amplifier without amplitude damping of the signal. Amplifier 30 is located in a telemetering circuit 31 having input terminals 32 and 33 coupled to the output terminals of transducer 10 as shown in FIG. 2. The circuit also includes an impedance matching network 34. The amplifier is designed so that it produces a distortion free output so long as the input to the amplifier does not exceed, say, plus or minus 2.5 volts. The amplifier has a high internal capacitance with the result that the 300 volt pulse shown in FIG. 6 charges this capacitance. Such a capacitance has a long decay characteristic shown by curve 35 in FIG. 7. During the decay period, the amplifier is effectively blocked from amplifying signals having peak values between ±2.5 volts. Accordingly, it is apparent that a significant portion of the information contained in the signal shown in FIG. 6 is not transmitted by the amplifier to a readout device to which the amplifier is connected.

As indicated above, a transducer according to this invention, has built-in overvoltage (overcharge) means for protecting impedance matching and signal conditioning devices to which the transducer is connected. Accordingly, a signal controlling means or trigger circuit 40 is coupled in series with crystal 15 between transducer output terminals 19 and 20. As shown in FIG. 3, the signal controlling means includes a pair of zener diodes 41 and 42 which are coupled in parallel opposition to one another, i.e., the zeners are arranged to conduct in opposite directions. A pair of conventional diodes 43 and 44 are also provided. Each of diodes 43 and 44 is coupled in series with a respective one of the zener diodes and is arranged relative to the zener diode so that it passes current to the zener diode in a direction corresponding to the reverse direction of the zener diode.

The voltage associated with the charge generated by a piezoelectric crystal is in the millivolt range, but the current associated with the charge is in the range of picoamperes (micro-micro-amperes). For such low current values, the slope of the volt/ampere curve of a zener diode operating in the reverse direction is non-linear from zero volts to the voltage associated with the zener knee shown at point 45 in FIG. 4. It is desired, however, that the output of transducer 10 be linear between the limiting values of the transducer output signal. Diodes 43 and 44 are disposed in series with the zener diodes to sharpen the zener knee of the zener diode-diode combination. As shown in FIG. 4, the combination of a zener diode and a diode in series moves the location of the zener knee from point 45 (see FIG. 4) to point 46, sharpens the contour of the zener knee, and provides for substantially linear variation of current with voltage as the voltage applied across the combination increases from zero to the zener voltage, i.e., the voltage associated with the zener knee. The zener diodes are selected to have zener voltages of, say, 5 volts thereby to define the twice values to which the output of the transducer is limited.

A pair of zener diodes are required in transducer 10 to limit both positive and negative voltages generated by crystals 15 and 16. Only one zener diode is required if the output of the transducer is to be controlled in only one direction.

The zener diodes have the characteristic that if the voltage impressed thereacross in the reverse direction is less than the zener voltage (±5 volts), the diode is non-conductive and functions as an open switch. A fully conducting reversely biased zener diode shows a substantially constant voltage drop across the diode equal to the zener voltage.

The operation of amplitude damped accelerometer 10 can be understood by considering each crystal 15, 16 as a charge generator. If it is assumed that each crystal is deformed sufficiently to generate a charge which, in conjunction with the internal capacitance of the accelerometer, would normally manifest at terminals 18, 19 a voltage (say, 2.5 volts) equal to one-half the zener voltage (say, 5 volts), the zener trigger circuit is rendered fully conductive in the reverse direction. This is so since the crystals are connected in series with the zener trigger circuit, although they are also connected in parallel opposition across the output terminals. Once one of the zeners is fully conducting in the reverse direction, the charges developed by the crystals cause current to flow through the crystals and the trigger circuit rather than through the load impedance coupled across the output terminals. Since the trigger circuit acts as a closed switch, albeit a switch having a constant voltage drop across it, the charges developed by the crystals have no place to accumulate and the charges are dissipated except to the extent that a voltage equal to the zener voltage is produced across the zener diode circuit. A voltage equal to the zener voltage but of opposite polarity is shared between the crystals. To the extent that the charges generated by the pair of crystals exceed the charge required to break down one of zener diodes 43, 44, these charges are subtracted from each other. In other words, the charge generated by crystal 15 is applied to crystal 16 to cancel the equal charge generated by crystal 16 to the extent that the charge generated by the crystal 15 exceeds one-half the charge (because of a sharing between the crystals of a charge equal in magnitude but opposite in polarity to the zener charge) required to break down one of the zener diodes to render the zener diode conductive in the reverse direction. Accordingly, the maximum voltage manifested across terminals 19, 20 as an accelerometer output is the voltage associated with the charge on crystal 16. This voltage can never exceed one-half the zener voltage if the crystals have equal voltage sensitivity.

Considering the behavior of the accelerometer by the signal presented to terminals 19, 20, trigger circuit or signal controlling means 40 defines a predetermined difference between the equal signals generated by the crystals and applied, but for the signal controlling means, to the terminals in opposition to each other. The difference is one-half the voltage (or charge) required to operate the signal controlling means. The signal controlling means applies the excess of the signal generated by crystal 15 over the value of this difference in opposition to the signal produced by crystal 16 so that the total signal presented to the terminals never exceeds the value of the predetermined difference.

FIG. 5 shows a signal conditioning means 40' which is comprised of a pair of high frequency transistors 48 and 49. A high frequency transistor has the elements thereof located close together so that breakdown of the transistor, when it is operated in the reverse direction, occurs at a low voltage. When such a transistor is operated in the reverse direction, it performs like a zener diode and has the characteristic that the knee in the volt/ampere curve in the reverse direction is nearly perfectly square. Transistors 48 and 49 are coupled in series by way of emitters 50 and 51, respectively. The base and collector of each transistor are coupled together as shown in FIG. 5.

FIG. 8 illustrates the overall output of accelerometer 10 when the accelerometer is subjected to an input of 6,000 g's so that each crystal of the accelerometer produces a voltage according to the graph of FIG. 6. It will be observed that to the extent each positive or negative voltage pulse produced by the respective crystals of the accelerometer exceeds 2.5 volts plus or minus, these pulses are clipped. Accordingly, transducer 10 has an output according to FIG. 8 and amplifier 30 accurately reproduces such an input without distortion. Moreover, the amplifier is not capacitatively blocked, and significantly more information carried by the transducer output signal is available at the output of the amplifier for observation or recordation.

FIG. 9 shows schematically an amplitude damped transducer 55 including a pair of piezoelectric crystals 56 and 57 coupled in series opposition to one another between transducer output terminals 58, 59. A signal controlling means or trigger circuit 40 in accord with the above description is connected in series with the crystals, although it will be understood that a transistor trigger circuit 40' may be used if desired. An impedance 60 is connected in parallel across crystal 57 and the signal controlling means. The circuit shown in FIG. 9 resembles the circuit shown in FIG. 2 of my copending application Serial Number 394,879, filed Sept. 8, 1964, for Frequency Damped Transducer. The copending application is referred to for a more detailed explanation of the frequency response of transducer 55 than is presented here. Crystals 56, 57 are matched crystals which generate equal charges when deformed equal amounts.

Assume that the trigger circuit of transducer 55 becomes conductive when the potential impressed across it exceeds 5 volts. When the combined voltage generated by crystal 57 and the voltage present across the impedance equals the zener voltage the trigger circuit will become conductive. The charge generated by crystal 57 then will be applied to the output terminals in opposition to the charge generated by crystal 56 to the extent that the charge generated by crystal 57, in combination with the voltage drop across impedance 60, exceeds the charge required to cause the trigger circuit to conduct. Impedance 60 has a low a value as possible so that the voltage sensitivity of the transducer is not reduced unduly. The voltage drop across the impedance when the trigger circuit becomes conductive thus is very small. The zeners in the trigger circuit therefore are selected to have zener voltages equal to the value to which the output voltage of the transducer is to be limited.

It will be recalled that a piezoelectric crystal has a definite capacitance. Accordingly, crystal 57 and impedance 60 constitute a filter, preferably a high pass filter. At low frequencies, the voltage generated by crystal 57 is suppressed relative to terminals 58, 59. The frequency of the voltage generated by the crystals must be greater than the tuned frequency of the filter before the output of crystal 57 can be applied fully to the terminals in opposition to the output of crystal 56. Transducer 55, therefore, is responsive by frequency. Transducer 10 is not affected by the frequency of the transducer input signal and is the presently preferred embodiment of the invention.

FIG. 10 shows a transducer 70 including a single piezoelectric crystal 71. A trigger circuit 40 is connected in parallel with the crystal across output terminals 72, 73. The trigger circuit has an impedance of very low value which, with the crystal, defines a filter having a very short time constant. The trigger circuit thus is blocked relative to the output terminals for an instant immediately following the generation of a charge by crystal 71. Accordingly, the full output of the crystal is presented across the terminals for a very short time before the trigger circuit becomes conductive, assuming the output of the crystal exceeds the charge required to cause the trigger circuit to conduit. Such a voltage peak across the terminals, however, may be sufficient to capacitatively block the signal conditioning circuits with which the transducer is used. Once the trigger circuit becomes conductive, the output of the transducer is limited to the zener voltage.

In the foregoing description, two separate crystals have been contemplated. In practice, however, only a single crystal need be used, but it is wired so that it produces two charges. Specifically, the single crystal is provided with electrical contacts at opposite ends. A contact is also provided, in the form of a plated conductive film, around the midlength of the crystal. Such a crystal is the full equivalent of crystals 15 and 16, or 56 and 57, described above. The single crystal construction is actually preferred over the double crystal arrangement since in the latter arrangement the lower crystal sees the mass of the seismic mass and of the upper crystal so that the lower crystal generates a greater charge per unit displacement of the seismic mass than the upper crystal. This disadvantage is not present in the single crystal construction. This invention, however, both in the foregoing description and in the following claims, encompasses both single and double crystal construction.

While the invention has been described above in conjunction with a piezoelectric accelerometer, and while certain parameters and numerical values have been mentioned, this has been by way of example only and is not to be considered as limiting the scope of the invention.

What is claimed is:

1. A transducer comprising means for generating a pair of charges having values proportional to the difference between the value of a selected physical phenomenon and a reference value of the phenomenon, a pair of transducer output terminals, means for applying one charge across the terminals, and means for subtracting the other charge from the one charge when the charge when the charge impressed on said means exceeds a predetermined value so that the transducer has an output signal defined by the difference in said charges which never has a value greater than a predetermined portion of said predetermined value.

2. A transducer comprising means for generating a pair of charges having equal values proportional to the difference between the value of a selected physical phenomenon and a reference value of the phenomenon, a pair of transducer output terminals, means for applying one charge across the terminals, and control means to which the other charge is applied for subtracting the other charge from the one charge when and to the extent that the charge impressed on said control means exceeds a predetermined value so that the transducer has an output signal defined by the difference in said charges which never has a value greater than said predetermined value.

3. A transducer comprising means for generating a pair of charges having equal values proportional to the difference between the value of a selected physical phenomenon and a reference value of the phenomenon, a pair of transducer output terminals, means for applying one charge across the terminals, and control means to which the charges are applied for substracting the other charge from the one charge when the charge impressed on said control means exceeds a predetermined value to the extent that the charges have a value exceeding one-half the predetermined value so that the transducer has an output signal defined by the difference in said charges which never has a value greater than one-half of said predetermined value.

4. A limited output transducer comprising a member mounted for movement in response to variations in a selected physical phenomenon to be measured by the transducer, signal generating means coupled to the member and responsive to the movement thereof for generating first and second electrical signals having values proportional to the movement of the member, transducer output terminal means, and means in the transducer for establishing at the terminal means a predetermined difference between the values of the first and second signals and for applying the smaller signal to the terminal means in opposition to the greater signal when and to the extent that the greater signal has a value greater than the predetermined value difference so that the total signal presented to the terminal means never has a value in excess of the predetermined difference.

5. An amplitude damped transducer comprising a member mounted for movement in response to variations in a selected physical phenomenon to be measured by the transducer, signal generating means coupled to the member and responsive to the movement thereof for generating first and second charges having substantially equal values proportional to the movement of the member, transducer output terminal means, means for coupling the signal generating means to the terminal means so that the charges oppose each other at the terminal means, signal controlling means to which the charges are applied for applying the second charge to oppose the first charge when and to the extent that the first charge has a value exceeding a predetermined value, whereby the value of the total signal presented to the terminal means is limited to the predetermined value.

6. An amplitude damped transducer comprising a member mounted for movement in response to variations in a selected physical phenomenon to be measured by the transducer, signal generating means coupled to the member and responsive to the movement thereof for generating first and second charges having substantially equal values proportional to the movement of the member, a pair of transducer output terminals, means for coupling the signal generating means to the terminals so that the first and second charges subtract from each other and so that the first charge can be applied across the terminals, a trigger circuit to which the charges are applied for applying the first charge across the terminals when the charges have a value less than a selected value and for coupling the second charge to the terminals to subtract from the first charge when and to the extent that when the signals each have a value in excess of the selected value, whereby the value of the total charge presented to the terminals is limited to the selected value.

7. An amplitude damped piezoelectric transducer comprising a member mounted for movement in a predetermined manner in response to variations in a selected physical phenomenon to be measured by the transducer, first and second matched piezoelectric crystal means coupled to the member and responsive to movement thereof for generating first and second charges, respectively, having substantially equal values proportional to the movement of the member, a pair of transducer output terminals, means for coupling the crystal means so that the first and second charges are subtractive, control means for preventing subtraction of the second charge from the first charge when the charges are each less than a charge of selected value and for applying the excess of the second charge over the selected value to subtract from the first charge when the charges each are in excess of the selected value, and means for applying the difference between the value of the first charge and the value of the second charge subtracted therefrom across the terminals, whereby the total charge value presented across the terminals is limited to the selected value.

8. A transducer according to claim 7 wherein the first and second crystal means are coupled in parallel between the terminals and are arranged so that the crystal means generate charges of opposite polarity for a given movement of the member, and the control means is coupled in series with the second crystal means between the terminals.

9. A transducer according to claim 8 wherein the control means provides a constant voltage drop thereacross, the voltage generated by a charge having the selected value corresponding to one-half the voltage drop.

10. A transducer according to claim 9 wherein the control means comprises a zener diode in which the zener voltage value corresponds to twice the voltage generated by a charge having the selected value.

11. A transducer according to claim 9 wherein the control means comprises a pair of zener diodes coupled in opposition to each other and having substantially equal values of zener voltage.

12. A transducer according to claim 7 wherein the crystal means are coupled in series opposition to each other across the terminals and the control means includes means a trigger circuit defining a constant voltage drop thereacross when conductive coupled in series with the crystal means and an impedance coupled in parallel across the trigger circuit and the one crystal means.

13. An amplitude damped piezoelectric accelerometer comprising a housing, a mass mounted in the housing for oscillatory movement along a predetermined line in response applied to the housing, first and second matched piezoelectric crystal means disposed in the housing between the mass and the housing and responsive to movement of the mass along the line toward the housing for generating first and second substantially equal charges proportional to the amplitude of movement of the mass, a pair of transducer output terminals, means for coupling the crystal means in parallel between the terminals, the crystal means being arranged so that the first and second charges are of opposite polarity with respect to the terminals, and control means conductive when the charges are equal to or greater than a selected value of charge and defining a constant voltage drop thereacross when conductive, the control means being connected in series with the second crystal means for preventing manifestation of the second charge across the terminals in opposition to the first charge when the second charge has a value less than the selected charge value and for applying the excess of the second charge over the selected charge value across the terminals in opposition to the first charge when the control means is conductive to limit the value of the charge manifested across the terminals to the value of said selected charge value.

14. An accelerometer according to claim 13 wherein the means coupled in series with the second crystal means comprises a pairs of zener diodes coupled in parallel opposition to one another and having zener voltage values corresponding to twice the voltage generated by a charge having the selected value.

15. An accelerometer according to claim 14 including a diode coupled in series with each zener diode and arranged in opposition to the forward characteristic of the zener diode.

16. An accelerometer according to claim 13 wherein the control means comprises a pair of transistors coupled in series by way of the emitters and having the collector and base of each transistor coupled together.

17. An accelerometer according to claim 13 wherein the means coupled in series with the second crystal means comprises a zener diode.

References Cited by the Examiner
UNITED STATES PATENTS 2,789,254    4/1957    Bodle et al.
3,153,152   10/1964    Hoffman _____ 307—88.5

RICHARD C. QUEISSER, *Primary Examiner.*

JAMES J. GILL, *Examiner.*